United States Patent
Wang

(10) Patent No.: US 11,454,528 B2
(45) Date of Patent: Sep. 27, 2022

(54) CORIOLIS MASS FLOWMETER AND NODE ELEMENT

(71) Applicant: KROHNE AG, Basel (CH)

(72) Inventor: Tao Wang, Canterbury (GB)

(73) Assignee: KROHNE AG, Basel (CH)

(*) Notice: Subject to any disclaimer, the term of this patent is extended or adjusted under 35 U.S.C. 154(b) by 0 days.

(21) Appl. No.: 17/089,787

(22) Filed: Nov. 5, 2020

(65) Prior Publication Data

US 2021/0131848 A1 May 6, 2021

(30) Foreign Application Priority Data

Nov. 5, 2019 (DE) ...................... 10 2019 129 744.3

(51) Int. Cl.
*G01F 1/84* (2006.01)

(52) U.S. Cl.
CPC ............ *G01F 1/8413* (2013.01); *G01F 1/845* (2013.01)

(58) Field of Classification Search
CPC .... G01F 1/8409; G01F 1/8413; G01F 1/8418; G01F 1/845
See application file for complete search history.

(56) References Cited

U.S. PATENT DOCUMENTS

| | | | |
|---|---|---|---|
| 5,602,345 A * | 2/1997 | Wenger | G01F 1/8404 73/861.357 |
| 5,979,246 A | 11/1999 | Van Cleve et al. | |
| 6,314,820 B1 | 11/2001 | Ollila | |
| 6,520,028 B1 | 2/2003 | Van Cleve et al. | |
| 7,275,449 B2 | 10/2007 | Hussain et al. | |
| 2008/0047361 A1 | 2/2008 | Rolph et al. | |
| 2011/0247433 A1 | 10/2011 | Werbach et al. | |
| 2015/0330821 A1 | 11/2015 | Werbach et al. | |
| 2020/0173827 A1 * | 6/2020 | Bell | G01F 1/8413 |

FOREIGN PATENT DOCUMENTS

| | | |
|---|---|---|
| DE | 102006034174 A1 | 1/2008 |
| DE | 102015003365 A1 | 9/2016 |

* cited by examiner

*Primary Examiner* — Erika J. Villaluna
(74) *Attorney, Agent, or Firm* — David S. Safran; Roberts Calderon Safran & Cole, P.C.

(57) ABSTRACT

A Coriolis mass flowmeter having at least one measuring tube with at least one oscillation generator and at least two oscillation sensors and having at least two node elements. The at least one oscillation generator excites the measuring tube to oscillation during operation. The at least two node elements define the oscillation range. At least one node element has at least one stiffening element. An effective separation of undesired interference oscillations of the measuring tube is achieved by the at least one stiffening element increasing the stiffness of the measuring tube with respect to oscillations orthogonal to the excitation mode and to the Coriolis mode so that, during operation, the oscillation frequency of the oscillation orthogonal to the excitation mode and to the Coriolis mode is greater than the oscillation frequency of the excitation mode, preferably greater than that of the Coriolis mode.

20 Claims, 3 Drawing Sheets

CORIOLIS MASS FLOWMETER AND NODE ELEMENT

BACKGROUND OF THE INVENTION

Field of the Invention

The invention is based on a Coriolis mass flowmeter with at least one measuring tube, with at least one oscillation generator and at least two oscillation sensors and with at least two node elements, wherein the at least one oscillation generator excites the measuring tube to oscillation during operation, wherein the at least two node elements define the oscillation range and wherein at least one node element has at least one stiffening element. In addition, the invention relates to a node element for use in a Coriolis mass flowmeter having at least one measuring tube, at least one oscillation generator and at least two oscillation sensors, and at least two node elements, wherein the at least one oscillation generator excites the measuring tube to oscillation in use, wherein the at least two node elements define the oscillation range, and wherein at least one node element comprises at least one stiffening element.

Description of Related Art

In order to determine the flow rate through a measuring tube, Coriolis mass flowmeters have an oscillation generator which sets the measuring tube into an oscillation (excitation mode). The flowing medium causes the tube to form a Coriolis mode, which as a rule corresponds to the first harmonic of the excitation mode. Oscillation sensors are arranged on the inlet and outlet sides of the measuring tube to record the oscillation of the measuring tube. By determining the phase displacement of the Coriolis mode oscillations measured at the oscillation sensors, the flow of the medium through the measuring tube can be determined.

It is known from the prior art to arrange node plates or node rings on the inlet and outlet side of the measuring tube in order to determine the oscillation range. These node plates or node rings fix the measuring tube, wherein end oscillation nodes are defined. In the context of this invention, the node element can also be designed as a node ring or a node plate.

In addition to the excitation of the desired Coriolis mode, the measuring tube is also excited into interference oscillations deviating from the Coriolis mode due to excitation with the oscillation generator, but also due to external interference sources. It is known to provide stiffening elements for the suppression or separation of such interference oscillations, which specifically influence the frequency and amplitude of the interference oscillations.

For example, the German Patent Application DE 10 2005 003 161 A1 and corresponding U.S. Pat. No. 7,275,449 B2 disclose a Coriolis mass flowmeter with two measuring tubes and with a connecting device connecting the measuring tubes, the connecting device being designed in such a way that its bending stiffness for bends in the common plane of the measuring tubes is greater than its torsional stiffness for torsional oscillations around the connecting line between the two measuring tubes.

German Patent Application DE 10 2015 003 365 A1 concerns a Coriolis mass flowmeter with two measuring tubes, wherein the measuring tubes are connected by a node plate and the node plate has an asymmetric stiffening means to increase zero point stability. In detail, the stiffening means serves to stabilize the relative position of the first and second measuring tubes in the area of their straight sections.

German Patent Application DE 10 2006 034 174 A1 also discloses a Coriolis mass flowmeter having two measuring tubes connected by a connecting unit, wherein the connecting unit comprises a stiffening plate fixed to both measuring tubes and arranged parallel to the common plane of the measuring tubes, and wherein a stiffening fin is provided on the stiffening plate. In this way, it is achieved that the bending stiffness of the connecting unit for bends in the common plane of the measuring tubes, in which the excitation oscillations of the measuring tubes generally also take place, is greater than the torsional stiffness of the connecting means for torsional oscillations.

In addition, the International Patent Application Publication WO 00/47956 A1 and corresponding U.S. Pat. No. 6,314,820 B1 disclose a Coriolis mass flowmeter with a measuring tube, wherein a node ring is arranged on the inlet and outlet sides of the measuring tube and wherein each node ring has lateral stiffening elements so that the frequency of undesired lateral oscillations is changed for the separation of the different oscillation modes.

SUMMARY OF THE INVENTION

Based on the above described prior art, it is the object of the present invention to provide a Coriolis mass flowmeter which guarantees a particularly effective separation of undesired interference oscillations of the measuring tube. In addition, it is the object of the invention to provide a corresponding node element.

According to a first teaching of the present invention, the object described above is achieved by a Coriolis mass flowmeter of the type mentioned above in that at least one node element is designed and arranged in such a manner that the stiffening element increases the stiffness of the measuring tube with respect to oscillations orthogonal to the excitation mode and to the Coriolis mode, so that, during operation, the oscillation frequency of the oscillation orthogonal to the excitation mode and to the Coriolis mode is greater than the oscillation frequency of the excitation mode, preferably greater than the frequency of the Coriolis mode.

According to the invention, it has been recognized that the integration of a stiffening element into the node element is particularly advantageous, so that oscillations, i.e., vertical oscillations in particular, orthogonal to the excitation mode and to the Coriolis mode can be distinguished from the excitation mode by their oscillation frequency. In detail, the oscillation range is reduced by at least one locally acting stiffening element for the oscillations in the plane of the stiffening element or elements. In this manner, interference oscillations can be taken into account or filtered out when receiving and/or evaluating the detected oscillation of the measuring tube, so that the measurement accuracy of the Coriolis mass flowmeter can be increased as a result. Additional components for the suppression of interference oscillations can thus be avoided.

According to a preferred design, at least one second stiffening element is present, wherein the second stiffening element is arranged, preferably opposite to the first stiffening element, on the at least one node element. The suppression of undesirable vertical oscillations is particularly effective according to this design. The second stiffening element may be identical to the first stiffening element or have a different shape and/or material.

Another advantageous design of the Coriolis mass flowmeter is that the at least one stiffening element with a resting surface rests on the circumference of the measuring tube. This design has the advantage that the stiffness of the measuring tube to oscillations orthogonal to the excitation oscillation is particularly high due to the direct and preferably large-area contact of the stiffening element with the measuring tube.

According to one design, at least one stiffening element covers less than 40%, preferably less than 30%, especially preferably less than 20%, of the measuring tube circumference. According to one design, the stiffening element covers less than 10% of the measuring tube circumference.

It is particularly preferred that the extension of the stiffening element perpendicular to the measuring tube is greater, at least in sections, than the extension of the stiffening element in the circumferential direction of the measuring tube. According to a further design, the extension of the stiffening element perpendicular to the measuring tube, at least in sections, is approximately as large as the extension of the stiffening element in the circumferential direction of the measuring tube.

According to a next design, the at least one stiffening element has at least two, preferably separate and/or separately acting, components. These components can be connected to each other or arranged separately on the measuring tube. It is particularly preferred that each component exerts a separate moment of area on the measuring tube. In this manner, the stiffness of the measuring tube can be further increased particularly effectively in relation to the interference oscillations to be suppressed.

It is particularly preferred that the extension of at least one component of the stiffening element perpendicular to the measuring tube is greater than the extension of this component in the circumferential direction of the measuring tube. The resulting increase in the moment of area increases the stiffness of the measuring tube against interference oscillations, which has an effect on the frequency of the interference oscillation.

According to the next advantageous design of the Coriolis mass flowmeter, the longitudinal extension of at least one component of the stiffening element is parallel to the longitudinal axis of the measuring tube. The extension of at least one component in the measuring tube direction is greater than in the other directions. In this manner, the contact area of the at least one component with the stiffening element is particularly large.

According to a next configuration, the at least two components are designed as at least two stiffening ribs, wherein the at least two stiffening ribs preferably rest on the measuring tube with the narrow edge. This design is particularly advantageous with regard to increasing the local stiffness of the measuring tube.

It is also particularly preferred when the at least two stiffening ribs are arranged parallel to each other in such a manner that the edges facing the measuring tube are arranged on a circular arc on the measuring tube.

It is also particularly advantageous when the longitudinal extension of the at least two stiffening ribs is aligned parallel to the longitudinal axis of the measuring tube.

It is particularly preferred that the individual components of the stiffening element are connected by at least one, preferably arc-shaped, attaching surface, preferably by the resting surface. According to one design, the at least one attaching surface is arranged on the side of the stiffening element facing the measuring tube and/or on the side of the stiffening element facing away from the measuring tube. According to a next design, two attaching surfaces are provided, one attaching surface being arranged on the side of the stiffening element facing the measuring tube and one attaching surface being arranged on the side of the stiffening element facing away from the measuring tube.

According to a next design, the at least one stiffening element is formed integrally with the node element. In the context of this invention, "integrally" means that the node element and the stiffening element are made of one workpiece and are not subsequently connected to one another.

According to a particularly preferred design, the at least one node element with the at least one stiffening element is applied directly to the measuring tube by means of a generative process. Alternatively, the at least one node element with the at least one stiffening element can also be produced by means of a conventional process and subsequently attached to the measuring tube.

According to a second teaching of the present invention, the object mentioned in the introduction is achieved by a node element described in the introduction, in particular in the form of a node ring or a node plate, in that the node element is designed in such a manner and can be arranged in such a manner during operation, that the stiffening element increases the stiffness of the measuring tube with respect oscillations orthogonal to the excitation mode and to the Coriolis mode, so that, during operation, the oscillation frequency of the oscillations orthogonal to the excitation mode and to the Coriolis mode is greater than the oscillation frequency of the excitation mode, preferably greater than the frequency of the Coriolis mode.

According to a particularly preferred design, the node element is designed to be suitable for all of the Coriolis mass flowmeters described above.

In detail, there is now a plurality of possibilities for designing and further developing the Coriolis mass flowmeter according to the invention. For this, reference is made to the following description of preferred embodiments in conjunction with the accompanying drawings.

DETAILED DESCRIPTION OF THE INVENTION

Figure 1:
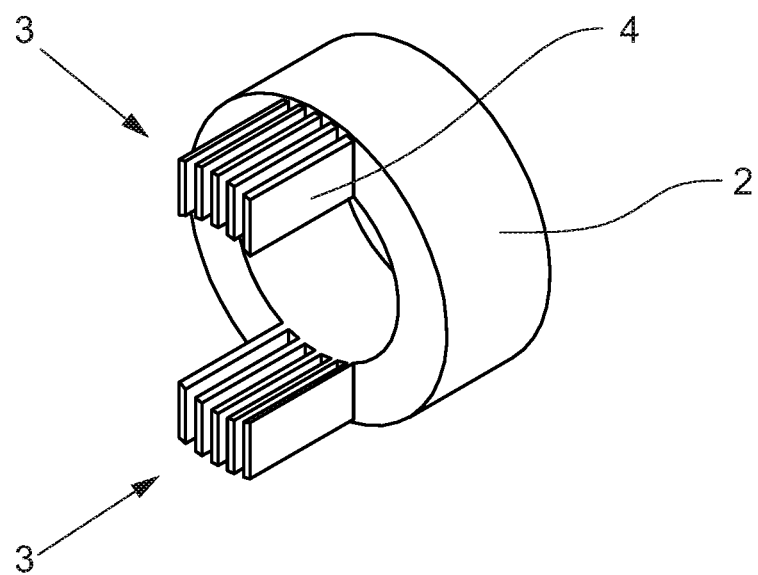
FIG. 1 is a perspective view of a first embodiment of a node element.

FIG. 1 shows a first embodiment of a node element 2, which is designed as a node ring, with a stiffening element 3. In the embodiment shown, the stiffening element 3 has five stiffening ribs 4. In addition, the node ring has a second stiffening element 3 which is arranged opposite the first stiffening element 3 on the node ring, wherein the second stiffening element also has five stiffening ribs 4. The individual stiffening ribs 4 of the stiffening elements 3 are aligned and arranged in such a manner that they rest on the measuring tube 6 of a Coriolis mass flowmeter 1 during operation. The stiffening ribs 4 are aligned in such a manner that, in the attached state, their longitudinal extension runs parallel to the measuring tube axis.

Overall, the shown node ring 2 is designed in such a manner that in the attached state it allows for the separation of the interference oscillations forming perpendicular to the excitation mode and to the Coriolis mode from the oscillations of interest of the Coriolis mode. At an excitation frequency of circa 430 Hz, the interference oscillation perpendicular to the Coriolis mode can be increased by circa 40 Hz to circa 470 Hz.

Figure 2:
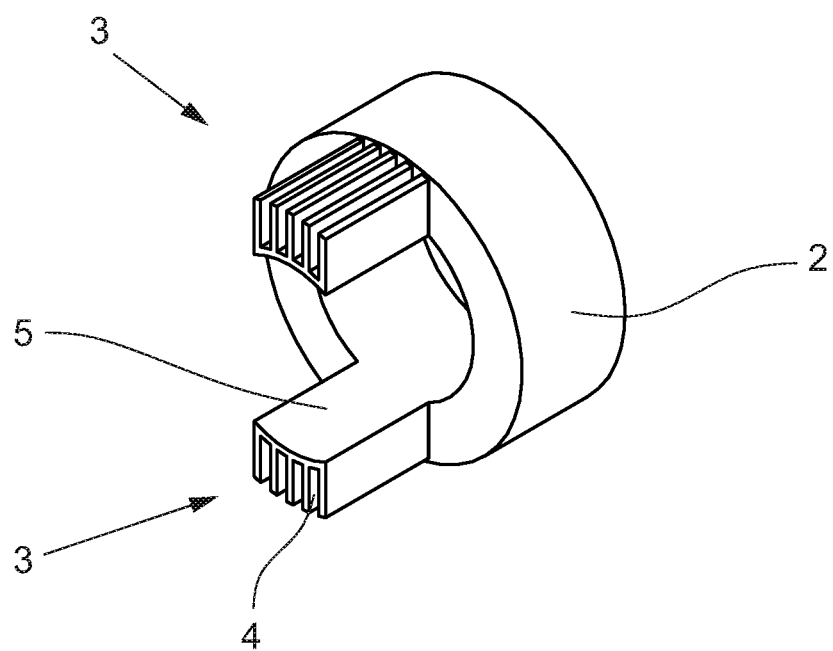
FIG. 2 is a perspective view of a second embodiment of a node element.

FIG. 2 shows a second example of a node ring 2 with two opposing stiffening elements 3, each with stiffening ribs 4. In contrast to the embodiment shown in FIG. 1, the individual stiffening ribs 4 are attached to each other by a resting surface 5.

Figure 3:
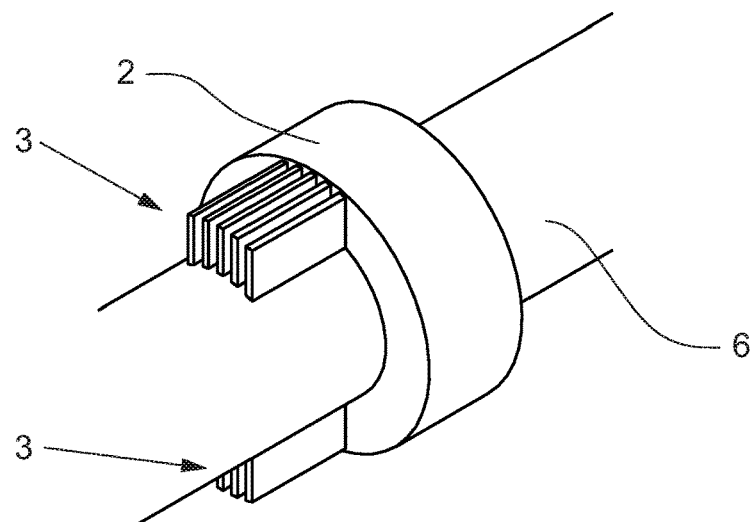
FIG. 3 is a perspective view of a third embodiment of a node element arranged on a measuring tube.

In FIG. 3, a node element 2 in the form of a node ring is arranged on a measuring tube 6. The stiffening ribs 4 rest on the measuring tube 6 in such a way that they increase the stiffness of the measuring tube 6 in the vertical plane in such a manner that the frequency of the oscillations in the vertical plane differs from the frequency of the oscillations in the horizontal plane.

Figure 4:
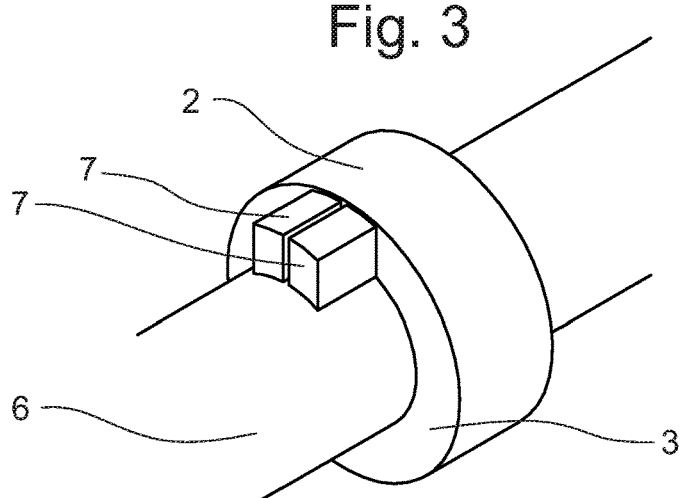
FIG. 4 is a perspective view of a fourth embodiment of a node element arranged on a measuring tube.

FIG. 4 shows a further embodiment of a node element 2 arranged on a measuring tube 6 in the form of a node ring, wherein in the embodiment shown, the node element 2 has a stiffening element 3, wherein the stiffening element 3 has two separate components 7. Both components 7 rest on the measuring tube 6. The components 7 are designed in such a manner that their extension perpendicular to the measuring tube 6 is greater than the extension of the respective component 7 in the circumferential direction of the measuring tube 6. In this way, the stiffness of the measuring tube 6 in the vertical direction can be increased particularly advantageously during operation.

Figure 5:
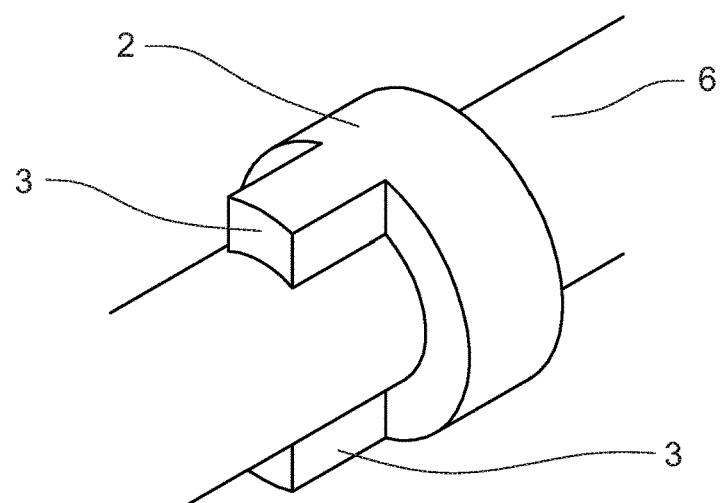
FIG. 5 is a perspective view of a fifth embodiment of a node element arranged on a measuring tube.

The node element 2 shown in FIG. 5 in the form of a node ring has two stiffening elements 3, which rest on the measuring tube 6 with a resting surface. The two stiffening elements 3 each cover less than 20% of the circumference of the measuring tube.

Figure 6:
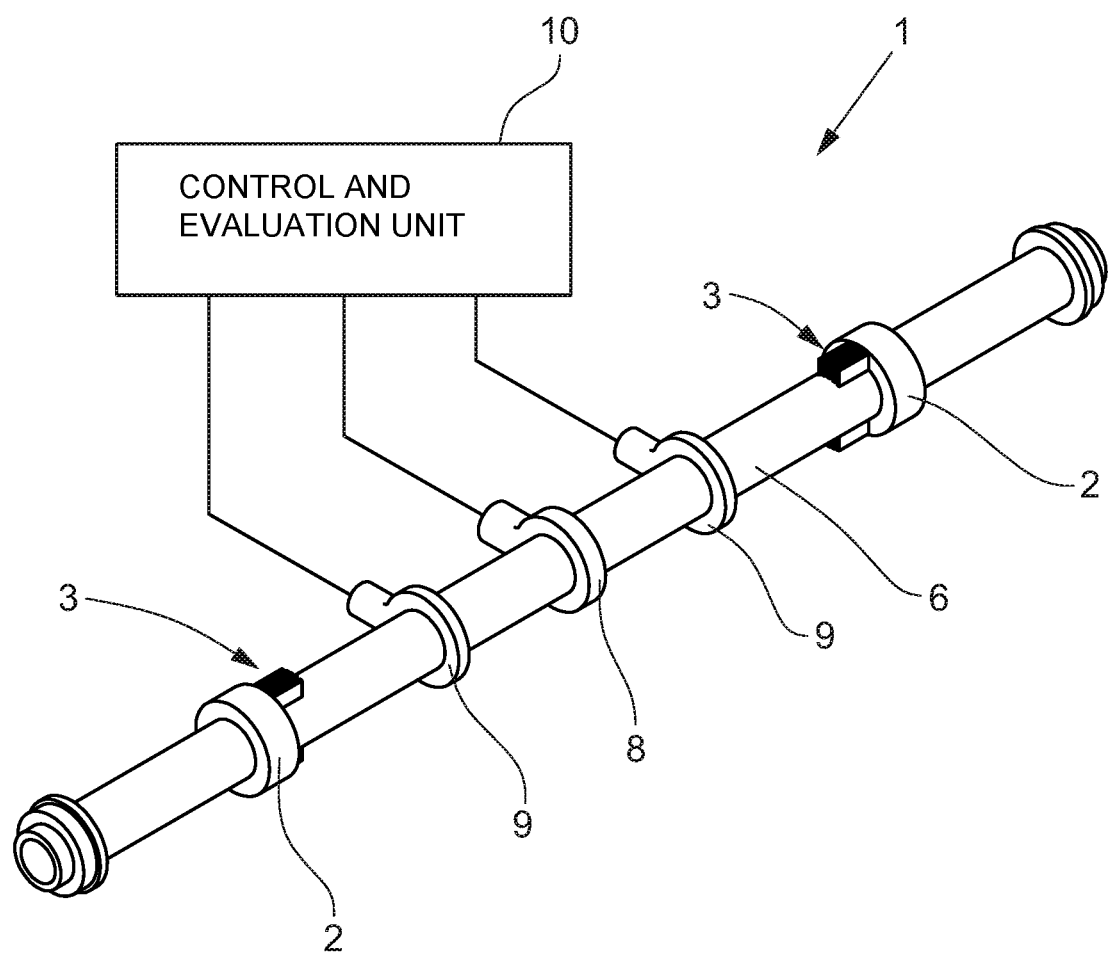
FIG. 6 is a perspective view of a first embodiment of a Coriolis mass flowmeter according to the invention.

FIG. 6 shows a first embodiment of a Coriolis mass flowmeter 1 with a measuring tube 6, with an oscillation generator 8 and two oscillation sensors 9 and with a control and evaluation unit 10.

In addition, two node elements 2 are arranged on the measuring tube 6, the node elements defining the oscillation range of the measuring tube 6. The node elements 2 each have two stiffening elements 3, which are aligned by the arrangement of the node elements 2 in such a manner that they increase the stiffness of the measuring tube 6 compared to the oscillations orthogonal to the excitation mode. Since interference oscillations can be effectively suppressed or filtered out, the Coriolis mass flowmeter shown here has a particularly high measuring accuracy.

What is claimed is:

1. A Coriolis mass flowmeter, comprising:
at least one measuring tube,
at least one oscillation generator, and
at least two oscillation sensors and having at least two node elements, wherein the at least one oscillation generator is adapted to excite the measuring tube to oscillation during operation,
wherein the at least two node elements define an oscillation range, and
wherein at least one of the at least two node elements has at least a first stiffening element,
wherein the at least one node element which has the first stiffening element is configured and arranged in such a manner that the stiffening element increases the stiffness of the measuring tube with respect to oscillations orthogonal to an excitation mode and to a Coriolis mode so that, during operation, the oscillation frequency of oscillation orthogonal to the excitation mode and to the Coriolis mode is greater than an oscillation frequency of the excitation mode, and
wherein the first stiffening element has at least two separately acting components or at least two separate components.

2. The Coriolis mass flowmeter according to claim 1, further comprising at least a second stiffening element, wherein the second stiffening element is arranged opposite to the first stiffening element on the node element.

3. The Coriolis mass flowmeter according to claim 1, wherein the first stiffening element has a resting surface that rests on a circumference of the measuring tube.

4. The Coriolis mass flowmeter according to claim 1, wherein at least the first stiffening element covers less than 40% the circumference of the measuring tube.

5. The Coriolis mass flowmeter according to claim 1, wherein the stiffening element extends a distance perpendicular to the measuring tube that is greater, at least in sections, than a distance that the stiffening element extends in a circumferential direction of the measuring tube.

6. The Coriolis mass flowmeter according to claim 1, wherein the extension of at least two components of the stiffening element extends a distance perpendicular to the measuring tube that is greater than a distance that the at least two components extend in a circumferential direction of the measuring tube.

7. The Coriolis mass flowmeter according to claim 1, wherein a longitudinal extension of the at least two components of the stiffening element extends parallel to the longitudinal axis of the measuring tube.

8. The Coriolis mass flowmeter according to claim 1, wherein the at least two components comprise at least two stiffening ribs, wherein the at least two stiffening ribs have a narrow edge that rests on the measuring tube.

9. The Coriolis mass flowmeter according to claim 8, wherein the at least two stiffening ribs are arranged parallel to one another in such a way that the narrow edges of the ribs are arranged on the measuring tube on a circular arc.

10. The Coriolis mass flowmeter according to claim 1, wherein the individual components of the stiffening element are connected by at least one arc-shaped connecting surface.

11. The Coriolis mass flowmeter according to claim 1, wherein the at least one stiffening element is formed integrally with the node element.

12. The Coriolis mass flowmeter according to claim 1, wherein the at least one node element has been applied directly to the measuring tube by a generative method.

13. The Coriolis mass flowmeter according to claim 1, wherein at least the first stiffening element covers less than 20% the circumference of the measuring tube.

14. The Coriolis mass flowmeter according to claim 1, wherein the at least two separately acting components or at least two separate components comprise a plurality of ribs which project from the node parallel to each other in an axial direction of the measuring tube.

15. A node element for use in a Coriolis mass flowmeter having at least one measuring tube, having at least one oscillation generator and at least two oscillation sensors and having at least two node elements, wherein the at least one oscillation generator excites the measuring tube to oscillation during operation, wherein the at least two node elements define the oscillation range and wherein at least one node element has at least one stiffening element, the node element comprising:

a body to which the at least one stiffening element is connected and having configuration adapted for being arranged on the measuring tube in such a manner that the at least one stiffening element increases the stiffness of the measuring tube with respect to the oscillations orthogonal to the excitation mode and to the Coriolis mode, so that, during operation, the oscillation frequency of the oscillation orthogonal to the excitation mode and to the Coriolis mode is greater than the oscillation frequency of the excitation mode, wherein the first stiffening element has at least two separately acting components or at least two separate components.

16. The node element according to claim 15, further comprising a second stiffening element, wherein the second stiffening element is arranged opposite to the first stiffening element on the node element.

17. The node element according to claim 15, wherein the at least one stiffening element has a resting surface that rests on a circumference of the measuring tube.

18. The node element according to claim 15, wherein the at least one stiffening element covers less than 40% the circumference of the measuring tube.

19. The node element according to claim 15, wherein the at least one stiffening element extends a distance perpendicular to the measuring tube that is greater, at least in sections, than a distance that the at least one stiffening element extends in a circumferential direction of the measuring tube.

20. The node element according to claim 15, wherein the at least two separately acting components or at least two separate components comprise a plurality of ribs which project from the node parallel to each other in an axial direction of the measuring tube.

* * * * *